United States Patent [19]

Aldrich

[11] 4,400,426

[45] Aug. 23, 1983

[54] THERMAL INSULATION MATERIAL COMPRISING A MIXTURE OF SILK AND SYNTHETIC FIBER STAPLE

[75] Inventor: William E. Aldrich, Ashaway, R.I.

[73] Assignee: Warnaco Inc., Bridgeport, Conn.

[21] Appl. No.: 317,762

[22] Filed: Nov. 3, 1981

[51] Int. Cl.$^3$ ........................ B32B 27/00; D04H 1/58

[52] U.S. Cl. .................................... 428/290; 428/288; 428/361; 428/362; 428/398

[58] Field of Search ............... 428/288, 280, 290, 293, 428/294, 359, 361, 362, 357

[56] References Cited

U.S. PATENT DOCUMENTS

| | | | |
|---|---|---|---|
| 2,271,184 | 1/1942 | Drefus | 428/359 |
| 3,044,914 | 7/1962 | Bell et al. | 156/219 X |
| 3,278,954 | 10/1966 | Barhite | 428/288 |
| 3,294,580 | 12/1966 | Kolb et al. | 428/288 |
| 3,595,731 | 7/1971 | Davies et al. | 428/151 |
| 3,639,195 | 2/1972 | Sanders | 156/62.6 |
| 3,987,613 | 10/1976 | Woods et al. | 57/256 |
| 4,199,642 | 4/1980 | Cooper et al. | 428/288 |
| 4,304,817 | 12/1981 | Frankosky | 428/288 |

*Primary Examiner*—Lorraine T. Kendell
*Attorney, Agent, or Firm*—Amster, Rothstein & Engelberg

[57] ABSTRACT

An improved thermal insulation material comprising a carded web containing 30 to 80 wt. %, preferably 50 wt. % silk, the balance being crimped, hollow polyester staple or very low denier solid cross section polyester filaments. The carded web is uniformly impregnated with a thermosetting resin to form a bat which is employed as a filler for garments, sleeping bags and the like.

10 Claims, No Drawings

THERMAL INSULATION MATERIAL COMPRISING A MIXTURE OF SILK AND SYNTHETIC FIBER STAPLE

This invention pertains to an improved thermal insulation material for use in parkas, sleeping bags and other articles. More particularly, the invention relates to a treated bat of blended polyester fibers and silk exhibiting improved thermal insulation characteristics, higher density and lower thickness in addition to the other desired physical characteristics of such materials.

Goose down, duck down and related water fowl feathers, and blends thereof, have long been employed as thermal insulation materials for clothing, sleeping bags and the like. Although down exhibits excellent thermal properties when new, it has a tendency to mat and lose its bulkiness or loft as a result of being subjected to compressive forces encountered under conditions of actual use, particularly if it becomes wet. Down garments, to be effective, also are normally characterized by high bulkiness which tends to interfere with movement of the wearer and to detract from the styling and appearance of such garments.

Polyester fibers have also been employed as garment and sleeping bag insulators. One such synthetic material is described in U.S. Pat. No. 3,772,137 and comprises a polyester pillow bat formed from low denier, crimped, hollow polyester fibers. While the use of such a synthetic material has a significant cost advantage as compared to down, it is generally recognized as being inferior to down with respect to insulating characteristics, softness and weight and is of comparable bulk.

U.S. Pat. No. 4,167,604, by the present inventor, describes and claims an improved thermal insulation material comprising a batting formed from a mixture of natural down and polyester fibers of the type described in U.S. Pat. No. 3,772,137. While this batting exhibits unexpectedly superiod thermal insulating characteristics as compared to pure down, it is also a relatively bulky material and suffers from problems similar to down in creating stylish, active sports garments.

Attempts have recently been made in the art to overcome the bulkiness problem in thermal insulation materials by providing blends of different types of polyester fibers or mixtures thereof with polyolefin fibers. Such materials are commercially available from du Pont under the trademark "Sontique" and from 3M Company under the trademark "Thinsulate". While these materials represent an improvement in that they provide good thermal insulation values at lower total thicknesses than the pure down or down/synthetic fiber mixtures, a need for further improvement remains.

It has now been discovered that a blend of silk fibers and synthetic fiber staple formed from polyester filaments may be formed into a novel insulating bat which exhibits thermal insulating properties superior to the prior art down or down/synthetic fiber blends. More importantly, those thermal insulating characteristics are achieved by bats having a thickness which is significantly lower, i.e., one-half to one-third as thick, than the materials now in use for such purposes. It is known in the prior art that silk fibers exhibit good thermal insulating properties and that knowledge has been used by the Chinese for a long period of time in the manufacture of garments. However, the batting of the present invention is unexpectedly superior to the insulating characteristics of pure silk padding in addition to being formed of cheaper and more readily available materials. In a preferred embodiment of the invention, a blend of silk and the synthetic fibers is formed into a carded web and treated with a thermosetting resin to form a bat which will retain its original loft and thermal insulating characteristics.

The synthetic polyester fibers which are employed in the improved thermal insulation material of the invention are well known in the art and may be either low denier solid filaments or hollow filaments. The preferred fibers are formed from polyethylene terephthalate, although other polyester materials as described in the foregoing prior art patent or otherwise known in the art may be employed. The hollow filaments, which are more fully described in U.S. Pat. No. 3,772,137, are crimped and have a denier per filament within the range of 3 to 6. The solid filaments are also crimped and normally have a denier per filament in the range of 1 to 3. The crimped polyester filaments are converted to staple having a length in the range of $1\frac{1}{8}$th to $2\frac{1}{2}$ inches prior to use in the formation of the insulation material of the invention. The polyester staple is garnetted to open up the staple fiber bundles as normally received from the manufacturer prior to being blended with the silk fibers to form a mixture suitable for conversion to the final web.

The silk fibers useful in the invention may be any natural silk material which has been subjected to degumming or other cleansing processes which are conventional in the normal manufacture of silk yarns. A preferred source of silk, due to cost and availability factors, is the waste silk from conventional silk yarn spinning. Since silk is a natural protein fiber produced by silkworms, the length and diameter of the silk fibers may vary widely and is not critical to the invention. Prior to being blended with the polyester staple fibers, the degummed silk fibers are garnetted to open and shred the fibers and produce fibers which are ordinarily 6 inches or less in length.

Although the relative amounts of silk and polyester staple may be varied over substantially broad limits, it has been found that at least 30 wt. % silk must be employed in order to achieve the superior thermal insulation characteristics of the material of the invention. In the preferred form of the invention, 50 wt. % silk is blended with 50 wt. % of polyester staple. However, amounts of silk ranging from 30 l to 80 wt. % and, preferably 40 to 60 wt. % can also be employed.

The blend of polyester staple and silk is formed into a carded web employing conventional carding equipment which is well known to persons of ordinary skill in the art. The carding operation serves to uniformly blend the silk and synthetic fiber staple. The carded web will ordinarily have a thickness in the range of 0.2 to 0.6 inches, but may be built up in multiple plies to produce a web having a thickness of one inch or more, depending upon the desired end use of the material. While the web thus formed will exhibit some degree of loft, as well as excellent thermal insulation qualities, it does not have a great amount of structural strength or resiliency. It is, however, significantly more dense than the down or down/synthetic fiber blends of the prior art. Accordingly, in a preferred embodiment of the present invention, the web after being built up into a desired thickness, is treated so as to uniformly impregnate the web with a film-forming thermosetting resin capable of forming a relatively rigid, non-tacky structure after curing. The treated web or batting possesses sufficient structural strength to permit normal handling during the manufacture of garments and also has the ability to withstand compressive forces encountered during use of garments or sleeping bags which would have a tendency to cause the batting to permanently mat down and reduce its insulating ability.

In a preferred embodiment, the uniform impregnation of the thermosetting resin is achieved by forming a dilute solution of the resin and applying it to the web through a series of spray nozzles maintained at a pressure which ensures a fine, even and thorough penetration of the resin solution throughout the thickness of the webbing, rather than the formation of a surface "skin" or film. A typical resin solution would consist of 5 to 25 wt. %, preferably 10 to 15 wt. %, of a melamine formaldehyde resin, e.g., trimethylol melamine formaldehyde; 0.75 to 3.75 wt. %, of preferably 1.5 to 2.25 wt. % of a curing agent for the selected resin, e.g., zinc nitrate; and 71.25 to 94.25 wt %, preferably 88.5 to 82.75 wt. % water. Other thermosetting, film-forming resins capable of forming a hard, non-tacky film after curing may be employed in lieu of the melamine-formaldehyde resin. Ordinarily, the amount of resin solution applied amounts to 5 to 10 wt. %, e.g., 8 wt. %, on a solids basis, of the final product.

The resin treated web will be subjected to heat curing prior to use. Typically, curing will be carried out in an oven maintained at a temperature of 250° to 375° F., e.g., 350° F., for a time ranging from 3 to 8 minutes, e.g., 5 minutes. Upon completion of the curing step, the batting is handled in the same manner as are conventional battings employed in garment manufacture.

The invention will be further understood by reference to the following illustrative example.

EXAMPLE 1

A crimped, hollow polyester filament commercially manufactured by du Pont and sold under the trademark "Hollofil" which has been treated with a hydrogen methylpolysiloxane lubricant was cut into staple having an average length of 2½ inches. The polyester stable and degummed silk were each subjected to separate conventional garnetting operations to break apart the fibers. Thereafter, 50 wt. % of silk was mixed with 50 wt. % of the treated polyester staple. The mixture was then carded in conventional equipment for that purpose to produce a web having the silk and polyester fibers uniformly dispersed therein and being approximately 0.3 inches in thickness. Thereafter, the web was moved on a conveyor belt beneath a series of spray heads operating at a pressure sufficient to cause a uniform mist of a resin solution consisting of 10.0 wt % trimethylol melamine formaldehyde, 1.5 wt % zinc nitrate and 88.5 wt. % water to uniformly penetrate the web. The treated batting was passed through a curing oven where it was held for approximately 5 minutes at a temperature of 275° F. to cure the thermosetting resin. The batting produced in the foregoing operation contained 8 wt. % resin on a solids basis.

In order to evaluate the insulating qualities of the treated batting of this invention, a series of identical tests were made in which the only difference was the nature of the insulation material and its thickness. The test consisted of forming individual battings of the various materials to be compared, making sure that the physical dimensions (other than thickness) of each batting were identical. The battings were then encased in taffeta fabric shells to form test pillows which were wrapped about a temperature sensing element. The pillow assemblies, including the sensing element, were then placed in the freezing chamber of a laboratory refrigerator and the other end of the sensing element was passed through the refrigerator door gasket and connected to a recording device which continuously records temperature over a period of time. The freezing chamber of the refrigerator was approximately 30° F. and each test was carried out for a period of one hour. The starting temperature for each sample was 75° F.

The foregoing test was applied to battings made of (A) Battings of the invention having thicknesses of 0.60 inches and 0.30 inches, (B) Blended battings as described in Example 1 of U.S. Pat. No. 4,167,604 having thickness of 1.45, 0.95 and 0.60 inches, (C) 100% natural down battings having thicknesses of 1.50 and 0.60 inches, (D) A batting formed of 100% hollow polyester filaments sold by du Pont under the trademark "Hollofil II", (E) A batting formed from du Pont "Sontique", and (F) A batting formed from 3M Company "Thinsulate". The results are set forth in Table I below:

TABLE I

| Batting Type | A | A | B | B | B | C | C | D | E | F |
|---|---|---|---|---|---|---|---|---|---|---|
| Numbers of Layers in test | 2 | 1 | 3 | 2 | 1 | 1 | 1 | 1 | 2 | 1 |
| Weight gms/yd² | 170 | 90 | 280 | 186 | 93 | 270 | 82 | 182 | 206 | 184 |
| Thickness - Inches | 0.60 | 0.30 | 1.45 | 0.95 | 0.60 | 1.50 | 0.60 | 1.50 | 0.60 | 0.65 |
| Temperature of | | | | | | | | | | |
| after 5 minutes | 74 | 74 | 74 | 74 | 73 | 74 | 72 | 73 | 74 | 74 |
| 10 | 72 | 72 | 71 | 70 | 69 | 71 | 68 | 70 | 70 | 70 |
| 15 | 67 | 67 | 66 | 65 | 62 | 66 | 61 | 65 | 63 | 64 |
| 20 | 62 | 62 | 62 | 60 | 56 | 61 | 55 | 60 | 57 | 58 |
| 25 | 58 | 57 | 57 | 55 | 51 | 56 | 51 | 55 | 53 | 53 |
| 30 | 54 | 54 | 53 | 50 | 46 | 52 | 46 | 49 | 49 | 49 |
| 35 | 51 | 51 | 50 | 47 | 42 | 49 | 43 | 46 | 45 | 45 |
| 40 | 50 | 50 | 49 | 45 | 40 | 48 | 41 | 45 | 42 | 43 |
| 50 | 47 | 47 | 46 | 44 | 38 | 45 | 39 | 43 | 41 | 42 |
| 60 | 45 | 45 | 44 | 42 | 37 | 43 | 38 | 41 | 40 | 41 |

The foregoing comparative experiment demonstrates that the silk/polyester batting of the invention exhibits the highest thermal insulating values of any material tested despite the fact that it was only ½ or less of the thickness of the battings of the other tested materials. The test further surprisingly demonstrates that the thermal insulating value of the batting of the invention is not improved by the use of a second ply of the same material, whereas thicker layers of down or of the batting of U.S. Pat. No. 4,167,604 did improve insulating values.

What is claimed is:

1. A thermal insulation material comprising a treated batting, said batting being formed from a carded web, said web containing at least 30 wt. % of natural silk fibers and a synthetic fiber staple, said synthetic fiber staple being formed from crimped polyester filaments having a denier per filament in the range of 1 to 6, said batting being formed by uniformly impregnating said carded web with a thermosetting resin capable of forming a relatively rigid, non-tacky structure after curing.

2. The material of claim 1 wherein said polyester filaments are hollow.

3. The material of claim 1 wherein said polyester filaments are solid and have a denier per filament in the range of 1 to 3.

4. The material of claim 1, wherein said thermosetting resin is trimethylol melamine formaldehyde.

5. The material of claim 1, wherein the resin constitutes 5 to 10 wt. % of the finished material.

6. A thermal insulation material comprising a treated batting, said batting being formed from a carded web, said web being a mixture of 30 to 80 wt. % of natural silk fibers and 70 to 20 wt. % of crimped polyester fiber staple having an average length of 1⅜th to 2½ inches, said polyester fiber staple being formed from hollow filaments having a denier of 3 to 6 per filament, said batting being formed by uniformly impregnating said carded web with a thermosetting resin capable of forming a relatively rigid, non-tacky structure after curing.

7. The insulation material of claim 6, wherein the thermosetting resin is trimethylol melamine formaldehyde.

8. The insulation material of claim 7, wherein said thermosetting resin is applied to said webbing as a curable aqueous solution.

9. The insulating material of claim 7, wherein said formaldehyde resin constitutes 8 wt. %, on a solids basis, of the batting.

10. A thermal insulation material comprising a treated batting, said batting being formed from a carded web, said web containing at least 30 wt. % of natural silk fibers and a polyester fiber staple, said polyester fiber staple being formed from filaments having a denier of 1 to 6 per filament, said batting being formed by uniformly impregnating said carded web with trimethylol melamine formaldehyde resin.

* * * * *